United States Patent Office 3,352,879
Patented Nov. 14, 1967

3,352,879
METAL CHELATES OF HYDANTOINS AND THEIR USE IN MAKING 5-SUBSTITUTED HYDANTOINS
Herman L. Finkbeiner, Ballston Lake, N.Y., assignor to General Electric Company, a corporation of New York
No Drawing. Filed Jan. 2, 1964, Ser. No. 335,428
20 Claims. (Cl. 260—299)

This invention relates to metal chelates of 5-carboxy hydantoins, the method of making these metal chelates, and to their use in the production of 5-substituted hydantoins which can be hydrolyzed to α-amino carboxylic acids. More specifically, this invention relates to the magnesium, zinc and calcium chelates of 5-carboxy hydantoins, to their method of preparation and to their use in the production of 5-substituted hydantoins which can be hydrolyzed to α-amino carboxylic acids.

α-Amino carboxylic acids, also called α-amino acids, result from the hydrolysis of naturally occuring proteins which are essential in the diet of animals. Many of the α-amino acids themselves have found wide utility as food supplements and therefore have become commercially important products and are sometimes called essential amino acids. Because of this, synthetic methods for the production of α-amino acids have been widely investigated in an attempt to produce them economically. However, because of the wide diversity of the chemical nature of the various amino acids which are desirable as food supplements, a single, economical method of synthesis which is common to a wide variety of these amino acids has not been developed. It would be highly desirable to have a single general method of preparation of α-amino acids which would permit the production of a wide class of these amino acids.

One of the best methods proposed for the preparation of α-amino acids is by the hydrolysis of a hydantoin substituted in the 5-position with the substituent corresponding to the organic moiety of the α-amino acid which is attached to the α-carbon atom of the α-amino acid. However, this method suffers from lack of a simple and general method of preparing a wide variety of the necessary 5-substituted hydantoins. Two methods have been used to prepare some of these hydantoins. One method requires the use of a reactive aryl aldehyde which condenses with hydantoin or thiohydantoin to form the 5-aralkylidene derivative which must then be reduced with a reducing agent to form the 5-aralkyl derivative which can be hydrolyzed to the α-amino-aralkyl carboxylic acid. This reaction was first described by Wheeler and Hoffman, Am. Chem. Jr., 45, 368 (1911). Typical of such a reaction is the reaction of benzaldehyde with hydantoin in the presence of acetic anhydride and sodium acetate to produce 5-benzylidenehydantoin which is reduced in the presence of red phosphorus and hydrogen iodide to 5-benzylhydantoin which is hydrolyzed in basic solution to phenylalanine. This method is apparently restricted to the production of aromatic-substituted α-amino acids and is dependent on having available the proper aromatic aldehyde to produce the necessary hydantoin intermediate.

The second method involves the Bücherer modification, described in J. Prakt. Chem. 140, 291 (1934) and 141, 5 (1934), of the modification of the Strecker procedure described by Pinner and Spilker in Ber. 22, 685 (1889). In this reaction, either an aldehyde is reacted with ammonia or ammonium chloride and then with hydrogen cyanide or potassium cyanide to produce the α-amino nitrile or the sodium bisulfite addition product of an aldehyde is reacted with potassium cyanide to produce the cyanohydrin. Both the α-amino nitrile and the cyanohydrin can be reacted with ammonium carbonate or urea to produce the 5-substituted hydantoin corresponding to the aldehyde, which can be hydrolyzed in alkaline solution to the α-amino acid. This latter reaction permits a wider variety of aldehydes to be used than the first method, but is still dependent on the availability of the required aldehydes, is tedious to carry out, and also has the danger of using very poisonous cyanides.

I have now discovered that the carbon atom in the 5-position of hydantoins containing a methylene (—$CH_2$—) group in the 5-position can be activated so that it will react with a much wider variety of alkylating agents than if the 5-position is not so activated, to produce a wide variety of 5-substituted hydantoins easily and inexpensively, which, upon hydrolysis, produce a wide variety of α-amino acids. I have found that the carbon atom in the 5-position of hydantoins having two hydrogens on the carbon atom in the 5-position (i.e., a methylene group) is activated by reacting the hydantoin with a metal alkyl carbonate where the metal is magnesium, calcium or zinc. These metal alkyl carbonates carboxylate the 5-position and form metal complexes of the corresponding 5-carboxyhydantoin. These magnesium, zinc and calcium complexes of the 5-carboxyhydantoins readily react with alkylating agents, for example, alkyl halides, alkylene dihalides, ketones, aldehydes, acyl halides, acyl anhydrides, Mannich bases, etc., to form 5-substituted hydantoins.

If the nitrogen in the 3-position has a hydrogen atom attached to it, i.e., there is no organic substituent on it, this —NH group is acidic and will react with bases to form salts. If one reacts such an hydantoin with the magnesium, zinc or magnesium alkyl carbonates, then 2 moles of the metal alkyl carbonate must be used for each mole of hydantoin, since 1 mole will react with the 3-position to form the corresponding metal salt. To avoid using this extra mole of the metal alkyl carbonate, the hydantoin can first be reacted with a base, for example, an alkali metal hydroxide, an alkali metal alkoxide, etc., to form the corresponding alkali metal salt with the acidic group in the 3-position. Now only 1 mole of the metal alkyl carbonate is required to form the metal complex of the 5-carboxyhydantoin as is also the case when the 3-position is substituted with an organic group.

Furthermore, if the hydantoin in unsubstituted in the 3-position with an organic group, the alkylating agent, if it is an alkyl halide, will react with the metal salt and will alkylate the 3-position at least as readily as the 5-position of the hydantoin. It is therefore necessary to use two equivalents of the alkylating agent to insure complete alkylation of the 5-position for those hydantoins which are not substituted in the 3-position with an organic group, whereas only one equivalent of alkylating agent needs to be used if the 3-position of the hydantoin is already substituted. For some as yet unexplained reason, the reaction of an alkylating agent with the 3-position of a 1-substituted hydantoin does not proceed as readily or as simply as it does when the 1-position is unsubstituted. However, the reaction of the alkylating agent with the metal complex of a 1,3-disubstituted 5-carboxyhydantoin proceeds as smoothly and as readily as though the 1-position were unsubstituted. I have further determined that the 1-position can be readily alkylated, if desired, after the 5-position has been alkylated, by using one more equivalent of alkylating agent then is required to alkylate the 5-position. In alkylating the 3-, 5- and 1-positions, the same or different alkylating agent can be used for the alkylation of each of these position. The haloaliphatic or arylhaloaliphatic alkylating agents preferably are used for alkylating the 1-position. They, along with acyl halides and Mannich bases, preferably are used to alkylate the 3-positions because the other alkylating agents, which are suitable for alkylating the 5-position, lead to more or less complex products when used to alkylate the 1- or 3-positions.

Since 3-substituted hydantoins are readily available or can be prepared either by the reaction of an alkyl or aryl isocyanate and glycine or by the alkylation of hydantoin itself, I prefer to form the metal complex of the hydantoin by using a hydantoin which is already substituted in the 3-position. This is because the nitrogen in the 3-position and its substituent are eliminated as an amine in the hydrolysis of the hydantoin and do not become part of the structure of the α-amino acid. If the desired amino acid has an N-substituent in the α-amino group, then either a hydantoin should be used which contains a substituent in the 1-position, or the amount of alkylating agent used should be sufficient to react with both the 5- and the 1-positions. If this N-substituent on the α-amino group forms a cyclic ring with the carbon atom on which the α-amino group is attached, then a bi-functional alkylating agent, i.e., an alkylating agent having two alkylating groups in the molecule, should be used, which will alkylate both the 5- and the 1-positions to form a bridge between the 1- and 5-positions.

These reactions can best be illustrated by the following equations in which the numbering of the hydantoin ring is as follows:

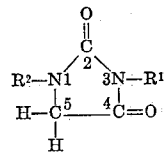

I. Formation of metal complexes of a 5-carboxyhydantoin:

(a) $R^1$ and $R^2$ are each a monovalent organic group, in addition $R^2$ may be hydrogen, $R^3$ is the alkyl moiety in the metal alkyl carbonate.

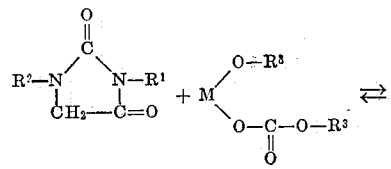

Removal of the $R^3OH$ causes the reaction to go to completion to the right, i.e., by distillation.

(b) When $R^1$ is hydrogen, $R^2$ is same as (a) above, but preferably hydrogen, M' is an alkali metal, $R^3$ is the alkyl moiety of an alcohol.

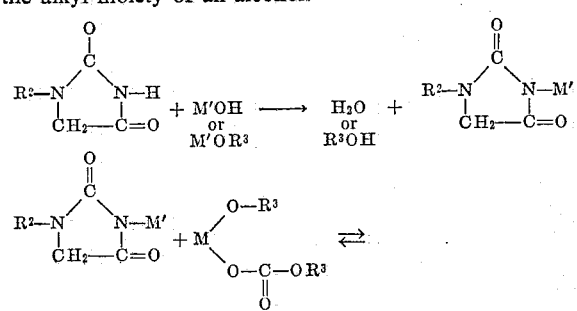

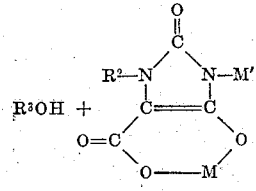

Removal of the $R^3OH$ causes the reaction to go to completion to the right. If the hydantoin is not converted to alkali metal salt in the first equation of (b), then 2 moles of the metal alkyl carbonate are required in the second equation of (b) with the metal of the metal alkyl carbonate forming a salt with the 3-position of the complex, i.e.,

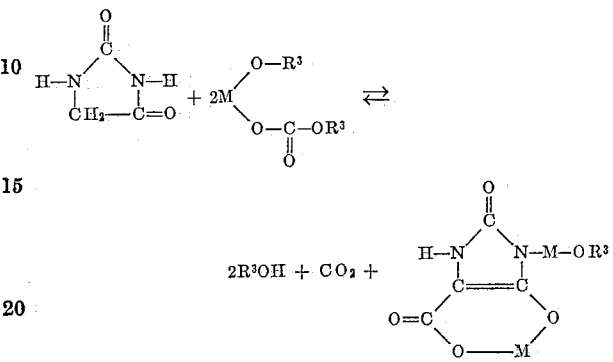

II. Alkylation reactions with haloaliphatic compounds (X is chlorine, bromine or iodine):

(a) $R^1$, $R^2$ and $R^4$ are each a monovalent organic group or, if $R^2$ is hydrogen, no excess alkylating agent is used.

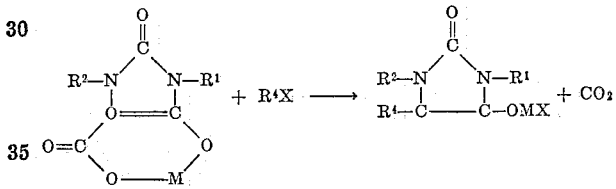

(b) $R^1$ and $R^4$ are each a monovalent organic group, $R^2$ is hydrogen and excess alkylating agent is used.

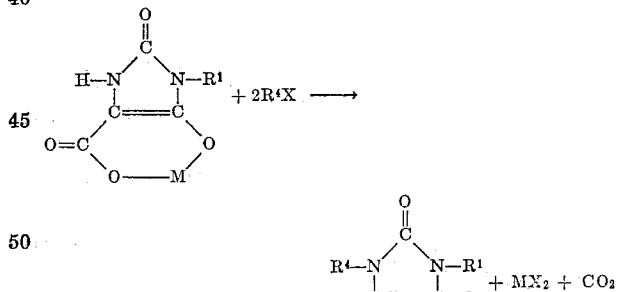

(c) $R^1$ is hydrogen, $R^2$ and $R^4$ same as II(a), but preferably $R^2$ is hydrogen, the hydantoin is first converted to alkali metal salt.

When $R^2$ is hydrogen, it can be substituted by $R^4$ by using excess alkylating agent as in II(b).

III. Alkylating reactions with dihaloaliphatic compounds (X as in II):

(a) $R^1$ and $R^2$ are each a monovalent organic group, $R^5$ is a divalent organic group and 1 mole (2 equivalents) of alkylating agent are used per mole of hydantoin complex.

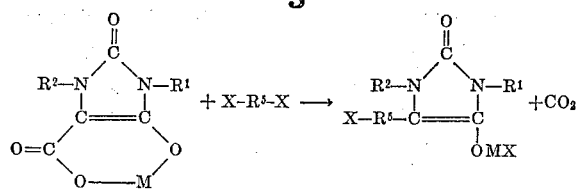

(b) Same as (a) but 2 moles of hydantoin complex are used per mole of alkylating agent.

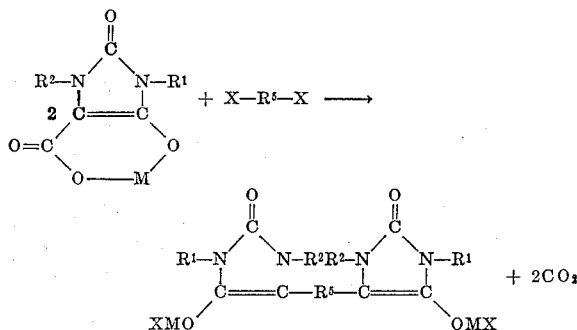

(c) Same as (a) but $R^2$ is hydrogen.

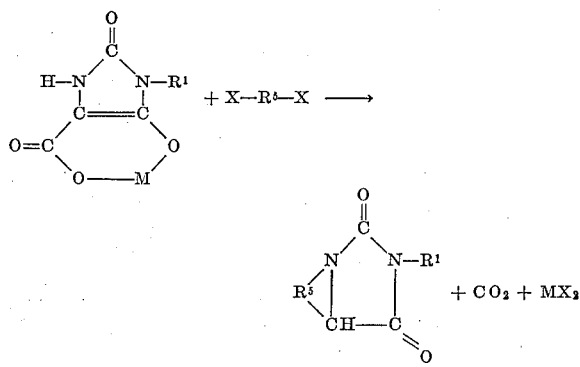

After the alkylating reaction, the metal salts of the hydantoins formed in the above reactions are, preferably, first converted to the corresponding hydantoins by reaction with an aqueous acid solution so that the isolation of the amino acid is simplified by separating the metal salt at this stage. This acid should be one which will form a water-soluble salt with the metal so that it can be washed from the alkylated hydantoin precipitate. Hydrochloric acid is the cheapest and most convenient acid but other mineral acids or water-soluble carboxylic acids, e.g., acetic acid, propionic acid, etc., may be used providing they do not form insoluble salts of the metal, e.g., sulfuric acid may be used for the magnesium and zinc salts but not for the calcium salts of the alkylated hydantoins. This reaction converts to the

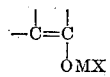

grouping in the above products to the

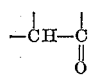

grouping. However, if desired, the metal salts may be hydrolyzed to metal salts of the amino acid followed by removal of the metal ion by well known techniques, e.g., ion exchange with the ion exchange resin in the hydrogen form, precipitation of the metal as an insoluble salt, etc., to produce the free amino acid.

IV. Hydrolysis of these hydantoins with an alkali leads to three general types of amino acids according to the following general equations:

(a) $R^1$, $R^2$ and $R^4$ are each a monovalent organic group, $R^2$ in addition can be hydrogen.

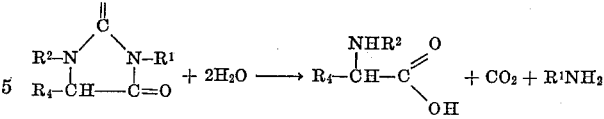

(b) $R^1$ is a monovalent organic group.

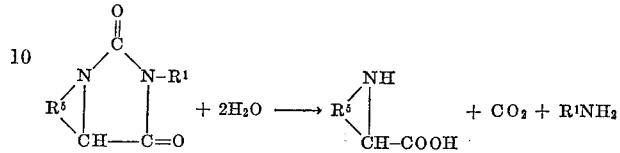

(c)

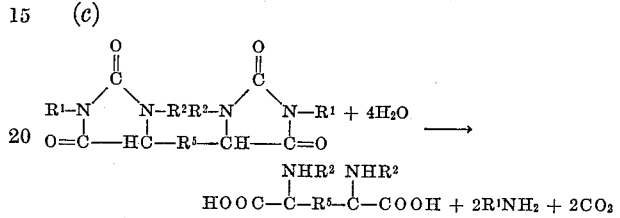

V. Alkylating and hydrolysis reactions with aldehydes and ketones:

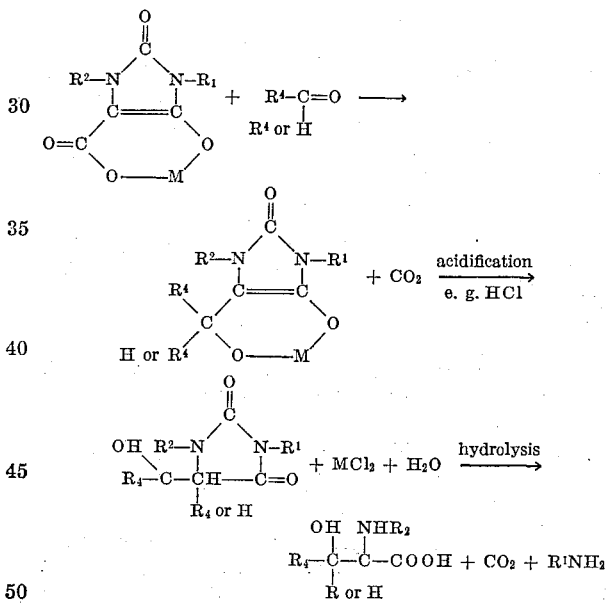

VI. Alkylating and hydrolysis reactions with Mannich bases:

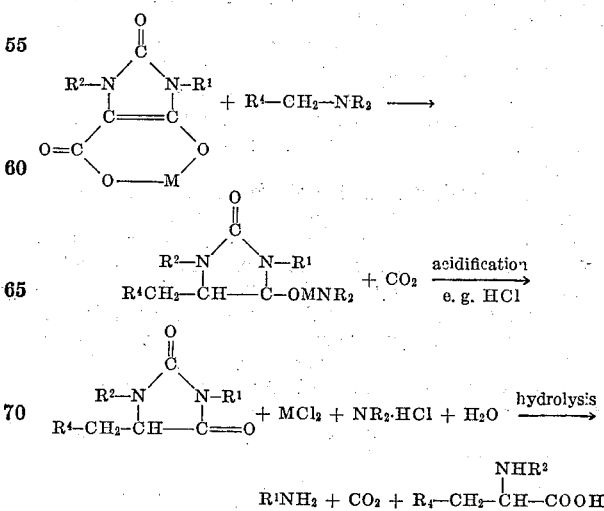

VII. Alkylating and hydrolysis reactions with acyl halides:

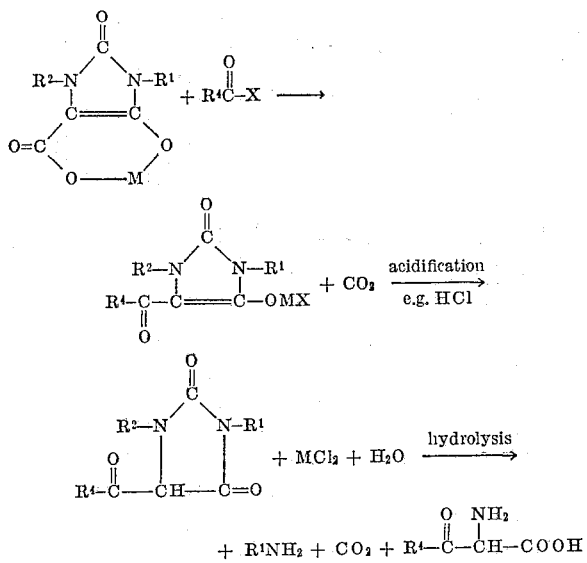

From the above discussion and equations, the following observations can be made:

Equations I($b$), II($c$) and IV($a$) show that, in general, the nitrogen atom in the 3-position of the hydantoin does not appear in the molecule of the amino acid product, but is the nitrogen of the amine formed as a by-product in the hydrolysis reaction. It is desirable, therefore, that $R^1$, since it will be the organic residue of the amine by-product, generally should be a relatively cheap substituent to introduce into the 3-position. Because of this, it is preferred that $R^1$ be a lower alkyl group, i.e., an alkyl group having from 1 to 10 carbon atoms, for example, methyl, ethyl, propyl, butyl, pentyl, hexyl, cyclohexyl, heptyl, octyl, nonyl, decyl including the various isomers of such alkyl groups for example, isobutyl, sec-butyl, 2,4-dimethylhexyl, isooctyl, etc., a lower alkyl group substituted with a phenyl or naphthyl group, wherein the phenyl or naphthyl group may also be substituted by one or more lower alkyl groups, i.e., an aralkyl group, for example, benzyl, phenylethyl, methylbenzyl, dimethylbenzyl, ethylbenzyl, naphthylmethyl, etc., or an aryl group, for example, phenyl, naphthyl, tolyl, xylyl, ethylphenyl, etc. However, if cost is no object, it is readily apparent that $R^1$ can be an alkyl group having more than 10 carbon atoms, e.g., up to 30 carbon atoms, without interfering with the reaction or with the production of the amino acid. As stated previously, 3-substituted hydantoins can be made either directly from an isocyanate and glycine or by direct alkylation of a hydantoin. For this reason, I prefer to start with a 3-substituted hydantoin in making the metal complex, since it simplifies the reaction and leads to a more straight-forward production of the 5-substituted hydantoins which can then be hydrolyzed to α-amino acids.

It is also evident from the above discussion and equations that when the amino group in the alpha position of the amino acid product is to be a —$NH_2$ group, then $R^2$ of the hydantoin should be hydrogen. On the other hand, there are many occasions when it is desired to produce α-amino acids in which the amino group is substituted with a single organic substituent. In this case, then, $R^2$ in the above equations should be the desired organic group, which it is desired to have substituted on the α-amino nitrogen of the amino acid product or the 1-position should be alkylated to introduce the desired substituent. Where it is desired to have a substituent such as this, $R^2$ is generally one of the same members as represented by $R^1$. However, if desired, it can also be the same as $R^4$ described below.

It is also evident from the above discussion and equations that when $R^2$ is hydrogen and a dihaloaliphatic compound is used as the alkylating agent, a cyclic ring can be formed by the alkylating agent, in which the nitrogen and the α-carbon atoms of the amino acid product also become members of the ring. In general, this cyclization reaction occurs most readily when the alkylating agent has from 2 to 5 carbon atoms and preferably from 3 to 4 carbon atoms between the halogen atoms, so that the cyclic structure so formed is a 4 to 7 and preferably a 5 to 6 membered ring. When the alkylating agent has more than 5 carbon atoms between the halogen atoms, then the reaction illustrated by Equation III($a$) or III($b$) will occur more readily than the cyclic reaction illustrated by Equation III($c$).

As will be readily apparent to those skilled in the art, if it is desired to carry out the alkylation reaction illustrated in Equation III($a$), it is preferable to add the metal complex of the hydantoin to the alkylating agent in order to increase the yield of the desired product, and to suppress any of the reaction shown in Equation III($b$). This is because, if the alkylating agent is added to the metal complex of the hydantoin, then at the start of the reaction, the metal complex will be temporarily in excess and cause some of the reaction shown in Equation III($b$). In carrying out the reaction to obtain the product shown in Equation III($b$), it does not matter if a product such as shown in Equation III($a$) is an intermediate in the reaction, since the product shown in Equation III($a$) is capable of further reaction with the metal complex of the hydantoin to form the product shown in Equation III($b$).

It is also evident from the above discussion and general equations that the actual substituents of $R^4$ and $R^5$ are completely dependent upon the desired α-amino acid to be obtained. In the above general equations which are representative of the reactions, when an alkyl halide or an alkylene dihalide is used as the alkylating agent, where X then is chlorine, bromine, or iodine, $R^4$ or $R^5$ may be any alkylene or alkyl group having from 1 to 20 carbon atoms, for example, from methyl to eicosyl, i.e., methyl, ethyl, propyl, butyl, octyl, dodecyl, hexadecyl, etc., including isomers of said alkyl groups, e.g., isopropyl, t-butyl, 2-methyl-4-ethyloctyl, etc., and methylene to eicosylene, inclusive, i.e., the group may be the divalent groups corresponding to the above alkyl groups. They may contain aryl, haloaryl, etc., substituents, for example, $R^4$ can be benzyl, chlorobenzyl, bromobenzyl, iodobenzyl, dichlorobenzyl, methylbenzyl, trimethylbenzyl, ethylbenzyl, phenylethyl, chlorophenylethyl, naphthylmethyl, bromonaphthylmethyl, etc., and $R^5$ can be arylylene, for example xylylene (phenylenedimethylene), phenylenediethylene, naphthyldimethylene, chlorophenylenedimethylene, etc.

Where an alkylation reaction such as illustrated in Equation III($a$) is carried out, the residual halogen on the aliphatic carbon atom of $R^5$ may be further reacted, for example, with ammonia, to produce an amino group which can further be reacted with ammonium cyanate to produce the ureido group, hydrolyzed with water to introduce a hydroxyl group, reacted with an alkaline solution of hydrogen sulfide to produce a sulfhydryl group, etc. Alkyl halides and alkylene dihalides, including aralkyl halides, aralkylene dihalides and arylenedi-(alkyl halides), are therefore convenient alkylating agents to use when it is desired to produce α-amino acids wherein the organic residue attached to the α-carbon atom, other than the amino and the carboxyl group, is alkyl, haloalkyl, aralkyl, haloaralkyl, alkylene, aralkylene, arylenedialkylene, haloaryldialkylene, haloalkylaralkyl, haloalkylhaloaralkyl, etc. In addition, alkylene and alkenyl halides, e.g., allyl halides, propargyl halides, etc., may be used to produce unsaturated α-amino acids. Alkyl and aryl ketones and aldehydes, especially those having from 1 to 10 carbon atoms in the alkyl or aryl group, examples of which are given above, are desirable alkylating agents when the desired amino acids are β-hydroxy-substituted α-amino acids.

Mannich bases of heterocyclic compounds and halomethylated heterocyclic compounds (which can be considered as heterocyclic-substituted methyl halides) are desirable alkylating agents when the desired residue attached to the α-carbon atom of the α-amino acid is a hetercoyclic group. Heterocyclic compounds having an active hydrogen atom will readily react with formaldehyde and a hydrogen halide to form the halomethyl derivative, whereas Mannich bases of heterocyclic compounds are well known compounds and are the reaction product of a heterocyclic compound having a reactive hydrogen on the ring, formaldehyde and a secondary amine. Since the secondary amine moiety of the Mannich base is split off as a by-product in the alkylation reaction, it preferably is a cheap amine, for example, a di-(lower alkyl)amine, e.g., dimethyl amine, etc.

Acidic groups present as substituents on the alkylating agent reduce the yield of α-amino acid product since they cause some decarboxylation of the metal complex of the 5-carboxyhydantoin. Alcoholic hydroxy groups are somewhat acidic. Phenolic hydroxyl groups are more acidic than alcoholic hydroxyl groups, while the carboxylic acid hydroxyl group is the most strongly acidic. Therefore, alcoholic hydroxyl groups cause the least decrease in yield because of decarboxylation while carboxylic hydroxyl groups cause the greatest decrease in yield. To obtain the maximum yield of product, it is desirable to inactivate these hydroxyl groups. This can easily be done by converting the alcoholic and phenolic hydroxyl groups to ethers. Phenolic and carboxylic hydroxyl groups can be converted to alkali metal salts. Both of these derivatives can then be converted back to the corresponding hydroxyl groups after the alkylation step which itself causes decarboxylation of the metal complex of the 5-carboxyhydantoin or after the hydrolysis of the hydantoin leading to the α-amino acid. By use of this technique the alkylating agents named above may be used which have hydroxyl and carboxyl groups on the alkyl or aryl nucleus.

In forming the magnesium, zinc or calcium alkyl carbonate, either the metal, in elemental form, is reacted directly with an alcohol or a salt of the metal is reacted with an alkali metal alkoxide. In the latter case, the alkali metal reacts with the anion of the initial salt and precipitates from the solution and can be removed by filtration, if desired, or left in the reaction mixture. In either case, the product is magnesium, zinc or calcium alkoxide. These metal alkoxides readily react with carbon dioxide to form the corresponding metal alkyl carbonate in which the alkyl group is the alkyl residue of the alcohol used. As Equation I(a) shows, the metal alkyl carbonates react with the hydantoin with the alkyl moiety of the metal alkyl carbonate being converted to the alcohol from which the metal alkoxide was originally made. Since the alkyl group of the metal alkyl carbonate does not appear in the final α-amino acid product, the choice of the alcohol to be used in forming the metal alkyl carbonate is based purely on economics and ease of use. For this reason, the lower alkyl alcohols, for example, methyl, ethyl, propyl, isopropyl, butyl, isobutyl, etc., alcohols, are generally used. The preferred alcohol is methyl alcohol, since it is more acidic than the other lower alkyl alcohols and more readily reacts with the metals to form the metal alkoxide.

Although more than one mole of carbon dioxide can be reacted with one mole of the metal alkoxide, see Finkbeiner and Stiles, J. Am. Chem. Soc. 85, 616–622 (1963), such a reaction requires that a partial pressure of carbon dioxide be maintained over the solution at all times. As soon as the partial pressure of the carbon dioxide is reduced below this level, the excess carbon dioxide is slowly expelled so that in a normal atmosphere of air, the stable product of the magnesium, zinc and calcium alkoxides is the reaction product of one mole of carbon dioxide with one mole of the metal alkoxide. Such a product is stable even in a nitrogen atmosphere. No benefit would be gained in using the metal alkyl carbonates formed with two moles of carbon dioxide to one mole of the metal alkoxide, since the excess carbon dioxide over the mole-to-mole compound would have to be expelled before the formation of the metal complex of the 5-carboxyhydantoin proceeds. The excess carbon dioxide over the ratio of one mole of carbon dioxide to one mole of the metal alkoxide has therefore served no useful purpose. However, it is to be understood that the metal alkyl carbonates having this excess carbon dioxide may be used in the practice of my invention in the manner described above.

These metal alkyl carbonates will react with all hydantoins containing a —CH$_2$— group in the 5-position, i.e., hydantoin itself, 1-substituted hydantoins, 3-substituted hydantoins, and 1,3-disubstituted hydantoins to form the corresponding metal complex of the corresponding 5-carboxyhydantoin. This reaction is carried out in solution using a solvent which will dissolve the hydantoin as well as the metal complex obtained as the product. Hydroxylic solvents such as alcohols tend to be reactive with the metal complex and therefore interfere with the obtaining of optimum yields in the same way as pointed out above with regard to the hydroxyl groups present in the alkylating agent. I therefore prefer to use nonreactive solvents, for example, N,N-dimethylformamide, generally called dimethyl formamide, tetrahydrofuran, dimethyl sulfoxide, etc. Such solvents can be diluted with a nonsolvent for the hydantoin and metal complex, for example, hydrocarbons such as benzene, toluene, xylene, etc., as long as the amount used does not cause insolubility of either the hydantoin or metal complex in the mixture. Since the metal alkoxide is formed in alcoholic solution, the excess alcohol is preferably removed before the metal alkyl carbonate formed from the alkoxide is added to the reaction mixture. This is because the reaction of hydantoins with the metal alkyl complex is an equilibrium reaction producing an alcohol which should be removed from the reaction mixture to produce the maximum yield of the metal complex of the 5-carboxyhydantoins. This can easily be done by applying reduced pressure at from ambient temperature up to about 50° C., to remove the bulk of the alcohol but higher temperatures should be avoided at this stage since otherwise the metal alkoxide is apparently rendered inactive by such treatment. The final traces of the alcohol are not removed until after adding the same type of solvent as is to be used to dissolve the hydantoin. This should be so chosen that it has a higher boiling point than the alcohol to be distilled. Conveniently, at this point, carbon dioxide can be bubbled into the mixture since the metal alkyl carbonate is more soluble than the metal alkoxide. After saturating the solution with carbon dioxide, the solution is heated above the boiling point of the alcohol, using reduced pressure if desired, although atmospheric pressure can be used, until the last trace of the alcohol is removed. A carbon dioxide atmosphere is maintained during both the distillation and cooling period to assure maximum yield of the metal alkyl carbonate. Any excess carbon dioxide is removed from the alkylation reaction mixture by sweeping the reaction vessel with dry air or nitrogen. This can be done after the hydantoin is added.

The actual quantity of metal alkyl carbonate in the solution prepared as described above is readily determined by adding a known volume of the solution to excess standard sulfuric acid, heating the solution to dispel carbon dioxide and back-titrating with standard sodium hydroxide. The metal alkyl carbonate prepared as described is an extremely stable solution and may be kept in stoppered bottles with no detectable change in its reactivity or titre.

The hydantoin which is to be complexed with the metal alkyl carbonate can be dissolved in the solution of the metal alkyl carbonate or it can be separately dissolved in another portion of the solvent, and the solution added to the metal alkyl carbonate. As the above equations indicate, at least one mole of the metal alkyl carbonate should be added for each mole of hydantoin since the complex is formed in the proportion of 1 mole of the alkyl carbonate to 1 mole of the hydantoin.

Since the alkylation of the metal complex of a hydantoin is also carried out in solution, there is no necessity for isolating the metal complex of the hydantoin since the solvents used for the making of the metal complex are admirably suited for carrying out the alkylation reaction. The solutions of the metal complexes can be stored and used as desired. However, it should be kept in mind that they are very reactive compounds, reacting even with the water vapor in air. Therefore, it is preferable that they be stored in tightly stoppered bottles if they are not used immediately.

As was pointed out above, the alkylating agent used to alkylate the 5-position of the hydantoin is chosen on the basis of the particular α-amino acid it is desired to produce. This determines the substituent on the α-carbon atom other than the amino and carboxyl group of the desired α-amino acid. The choosing of the particular alkylating agent can be illustrated from the following table which lists a wide selection of the known α-amino acids and shows a typical alkylating agent which can be used in my process to prepare the desired 5-substituted hydantoin which is then hydrolyzed to the desired α-amino acid. Where the alkylating agent is indicated as a halide in the table, it is to be remembered that X may be either bromine, chlorine, or iodine. Since the chlorides are the most readily available and the most economical to use, they are the preferred halide.

TABLE I

| Desired Amino Acid | Alkyl group to be substituted on 5-position of hydantoin | Alkylating Agent |
|---|---|---|
| Alanine. $$CH_3-\overset{NH_2}{\underset{|}{C}H}-COOH$$ | $CH_3-$ | $CH_3X$ |
| Butyrine. $$CH_3CH_2-\overset{NH_2}{\underset{|}{C}H}-COOH$$ | $CH_3CH_2-$ | $CH_3CH_2X$ |
| Valine. $$\overset{CH_3}{\underset{CH_3}{\diagup}}CH-\overset{NH_2}{\underset{|}{C}H}-COOH$$ | $\overset{CH_3}{\underset{CH_3}{\diagup}}CH-$ | $\overset{CH_3}{\underset{CH_3}{\diagup}}CHX$ |
| Norvaline. $$CH_3CH_2CH_2-\overset{NH_2}{\underset{|}{C}H}-COOH$$ | $CH_3CH_2CH_2-$ | $CH_3CH_2CH_2X$ |
| Leucine. $$\overset{CH_3}{\underset{CH_3}{\diagup}}CH-CH_2-\overset{NH_2}{\underset{|}{C}H}-COOH$$ | $\overset{CH_3}{\underset{CH_3}{\diagup}}CH-CH_2-$ | $\overset{CH_3}{\underset{CH_3}{\diagup}}CH-CH_2X$ |
| Isoleucine. $$CH_3-CH_2-\overset{CH_3}{\underset{|}{C}H}-\overset{NH_2}{\underset{|}{C}H}-COOH$$ | $CH_3-CH_2-\overset{CH_3}{\underset{|}{C}H}-$ | $CH_3-CH_2-\overset{CH_3}{\underset{|}{C}H}X$ |
| Phenylalanine. 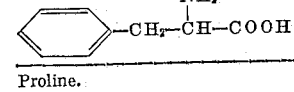 | 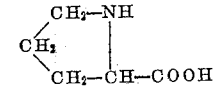 | 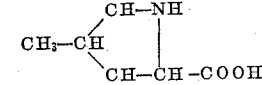 |
| Proline. 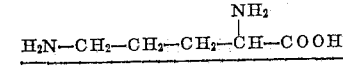 | 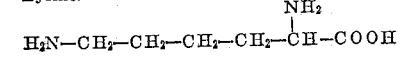 | $X-CH_2-CH_2-CH_2X$ |
| γMethylproline. | | $X-CH_2-\overset{CH_3}{\underset{|}{C}H}-CH_2X$ |
| Ornithine. $$H_2N-CH_2-CH_2-CH_2-\overset{NH_2}{\underset{|}{C}H}-COOH$$ | $H_2N-CH_2-CH_2-CH_2-$ | $H_2N-CH_2-CH_2-CH_2X$ |
| Lysine. $$H_2N-CH_2-CH_2-CH_2-CH_2-\overset{NH_2}{\underset{|}{C}H}-COOH$$ | $H_2N-CH_2-CH_2-CH_2-CH_2-$ | $H_2N-CH_2-CH_2-CH_2-CH_2X$ |

TABLE I—Continued

| Desired Amino Acid | Alkyl group to be substituted on 5-position of hydantoin | Alkylating Agent |
|---|---|---|
| Aspartic acid.<br>$$HOOC-CH_2-\overset{NH_2}{\underset{|}{CH}}-COOH$$ | $HOOC-CH_2-$ | $HOOC-CH_2-X$<br>In form of alkali metal salt. |
| Glutamic acid.<br>$$HOOC-CH_2-CH_2-\overset{NH_2}{\underset{|}{CH}}-COOH$$ | $HOOC-CH_2-CH_2-$ | $HOOC-CH_2-CH_2X$<br>In form of alkali metal salt. |
| Phenylserine (two diastereoisomers).<br> | 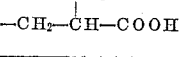 | 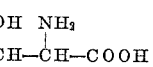 |
| Methionine.<br>$$CH_3-S-CH_2-CH_2-\overset{NH_2}{\underset{|}{CH}}-COOH$$ | $CH_3-S-CH_2-CH_2-$ | $CH_3-S-CH_2-CH_2X$ |
| Histidine.<br> |  | <br>or<br>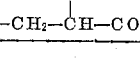 |
| Tryptophan.<br>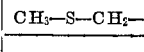 | 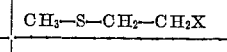 | 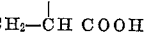 |
| Tyrosine.<br>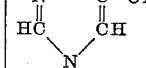<br>Benzene ring can be halogenated with from 1 to 4 halogen atoms, e.g., fluorine, chlorine, bromine, iodine. | 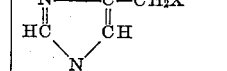 | <br>Preferably used in form of ether derivative, e.g.,<br> |
| Thyroxine.<br> | 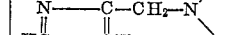 | <br>Preferably used in form of ether derivative. |
| α,α' Diaminododecanedioic acid.<br>$$HOOC-\overset{NH_2}{\underset{|}{CH}}-(CH_2)_8-\overset{NH_2}{\underset{|}{CH}}-COOH$$ | $-CH_2-(CH_2)_6-CH_2-$ | $X-CH_2-(CH_2)_6CH_2-X$ |
| Naphthylalanine (either α or β).<br>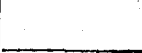 |  | 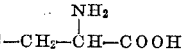 |

TABLE I—Continued

| Desired Amino Acid | Alkyl group to be substituted on 5-position of hydantoin | Alkylating Agent |
| --- | --- | --- |
| 4 pyridylalanine. $N\!\!\diagup\!\!\diagdown\!\!-\!\!CH_2\!-\!\overset{NH_2}{\underset{|}{CH}}\!-\!COOH$ | $N\!\!\diagup\!\!\diagdown\!\!-\!\!CH_2\!-$ | $N\!\!\diagup\!\!\diagdown\!\!-\!\!CH_2X$ |
| 3 thionaphthenyl alanine. (benzothiophene)—$C\!-\!CH_2\!-\!\overset{NH_2}{\underset{|}{CH}}\!-\!COOH$ | (benzothiophene)—$C\!-\!CH_2\!-$ | (benzothiophene)—$C\!-\!CH_2X$ |
| Thienylalanine. $\underset{HC}{\overset{HC=\!=\!CH}{\diagdown_S\diagup}}C\!-\!CH_2\!-\!\overset{NH_2}{\underset{|}{CH}}\!-\!COOH$ | $\underset{HC}{\overset{HC=\!=\!CH}{\diagdown_S\diagup}}C\!-\!CH_2\!-$ | $\underset{HC}{\overset{HC=\!=\!CH}{\diagdown_S\diagup}}C\!-\!CH_2X$ |

In order that those skilled in the art may readily understand how the above reactions are carried out, the following examples which are illustrative of the practice of my invention are given by way of illustration only and are not for purposes of limitation. All percentages are by weight unless specifically stated.

Example 1

This example illustrates the preparation of the magnesium, zinc and calcium alkyl carbonates. Magnesium methyl carbonate is readily prepared by the following procedure: 8 liters of anhydrous methanol are placed in a 12-liter flask equipped with a reflux condenser, stirrer and gas inlet. A few grams of magnesium are added and after the reaction is initiated a total of 480 grams of magnesium turnings are added at a rate to maintain a constant but controlled reflux of the methanol. After the magnesium is completely reacted, the excess methanol is stripped off under the vacuum of a water aspirator. A 50° C. water bath is used to heat the mixture and stirring is continued as long as possible to aid in removing the methanol. To aid in the redissolution of the magnesium methoxide, it is desirable to leave some methanol in the solid mass obtained. Therefore, when the pressure in the system can no longer be decreased (approximately 20 mm.), enough dimethyl formamide is added to the flask to give a total volume of 10 liters. Carbon dioxide is admitted through the gas inlet to the stirred reaction mixture as rapidly as it can be absorbed. A bubble counter is used at the outlet of the system to maintain a positive pressure of carbon dioxide.

After all the solid magnesium methoxide is dissolved a short bubble-cap fractionating column is substituted for the reflux condenser and the temperature is raised gradually to distill any remaining methanol. The reaction mixture is stirred, still maintaining a slow stream of carbon dioxide during the distillation which is stopped when the temperature at the head of the column is approximately 150° C. The mixture is cooled to room temperature under carbon dioxide to assure saturation.

The magnesium methyl carbonate solution prepared in this fashion is stable and can be used over a period of 7 months with no detectable change in its effectiveness. The molarity of the solution with respect to magnesium is about 2 M. The exact concentration is determined by adding a known volume to excess standard sulfuric acid followed by heating to dispel carbon dioxide and back-titrating with standard sodium hydroxide.

Calcium methyl carbonate is prepared in the same manner as described above for magnesium methyl carbonate except using 800 g. of calcium metal in place of the magnesium metal.

Zinc methyl carbonate is most readily prepared as follows:

Twenty-five ml. of a 2 M methanolic solution of sodium methylate and 25 ml. of a 1 M solution of anhydrous zinc chloride in anhydrous methanol are carefully mixed since the reaction is exothermic. The solution may be filtered or decanted from the sodium chloride precipitate. However, since the sodium chloride does not interfere either with the formation of the zinc methyl carbonate, with the formation of the zinc complex of the 5-carboxyhydantoins, or with the alkylation reaction, it is more convenient to leave it in the reaction mixture since it will dissolve in the aqueous phase when the reaction mixture is acidified after the alkylation step and thereby separated from the 5-substituted hydantoin product. If desired, the zinc methyl carbonate solution may be filtered or decanted from the sodium chloride.

The solution of the zinc methylate in methyl alcohol is converted to a solution of zinc methylate in 50 ml. of dimethylformamide and reacted with carbon dioxide to form zinc methyl carbonate in the same way as described above in Example 1 for the conversion of magnesium methylate to magnesium methyl carbonate.

Example 2

This example illustrates how the 3-position of hydantoin may be alkylated to prepare a 3-substituted hydantoin. A solution of 10 g. of hydantoin and 4 g. of sodium hydroxide in 100 ml. of 50% aqueous ethanol is stirred rapidly while 13 g. of benzyl chloride is added. The reaction mixture is refluxed for 18 hours, cooled to room temperature, and then the reaction mixture poured into a slurry of 200 g. of ice and 200 ml. of water. The crystalline product is filtered off and recrystallized from benzene. A yield of 15.8 g. (83% yield) of 3-benzylhydantoin having a melting point of 140–141° C. is obtained. This agrees with the reported melting point of 141° C.

A suspension of 50 g. of hydantoin in 1000 ml. of absolute ethanol is warmed until essentially all of the hydantoin is dissolved. A solution of 30 g. of potassium hydroxide in 250 ml. of ethanol is slowly added with stirring. After several minutes the potassium salt of hydantoin starts to precipitate. When precipitation is complete the salt is removed by filtration, washed with ethanol and dried. A suspension of 42 g. of this salt in 350 ml. of N,N-dimethyl-formamide is reacted with 80 g. of 1-bromodecane by stirring the reaction overnight at room temperature and then heating for 2 hours at 75° C. On cooling to room temperature, the precipitate of potassium bromide is removed by filtration and the dimethylformamide removed under vacuum. Chloroform is added to dissolve the 3-decylhydantoin and leave the balance of the potassium bromide as undissolved residue which is filtered from the solution. Evaporation of the chloroform and recrystallization from ethanol gives a yield of 44.5 g. of 3-decylhydantoin having a M.P. of 95–97° C.

When this procedure is repeated on a ⅓ scale and using ⅓ the equivalent amount of ethyl bromide for the decyl bromide, a yield of 6.5 g. of 3-ethylhydantoin, M.P. 100–102° C. (literature 102° C.) is obtained.

*Example 3*

This example illustrates how a 3-substituted hydantoin may be made from the appropriate isocyanate and glycine and a 1,3-disubstituted hydantoin may be prepared from the appropriate isocyanide and α-amino acid. Over a period of 4 hours, 132 g. of phenylisocyanate are added slowly to a solution of 75 g. of glycine, 68 g. potassium hydroxide in 400 ml. of water. After standing overnight at room temperature, the diphenyl urea produced as a by-product and which has precipitated, is filtered off. The filtrate is acidified to precipitate the hydantoic acid, which is removed from the solution by filtration and dried in air. The phenyl hydantoic acid is cyclicized to 3-phenylhydantoin by refluxing it for 1 hour with 200 ml. of water and 200 ml. of concentrated hydrochloric acid. The product crystallizes from the solution on cooling and is recrystallized from an ethanol-water mixture. The yield of 3-phenylhydantoin is 125 g. (72%) having a melting point of 156–158° C., compared to a reported melting point of 154–155° C.

When this example is repeated on an 0.1 scale and substituting 0.1 the equivalent amount of sarcosine for the glycine, a yield of 17.3 g. (91%) of 1-methyl-3-phenylhydantoin, M.P. 109–110° C., reported 108–110° C., is obtained.

*Example 4*

This example illustrates the simultaneous alkylation of both the 3- and the 5- position of the magnesium complex of 5-carboxyhydantoin, which is prepared by dissolving 5.0 g. of hydantoin in 50 ml. of 2 M solution of the magnesium methyl carbonate prepared in Example 1. The solution is heated for 1.5 hours at 60° C. to form the magnesium salt of the magnesium complex of 5-carboxyhydantoin. To this solution is added 15.2 g. of benzyl chloride by drops since a vigorous reaction occurs. The solution is heated at 110° C. for 5 hours. After cooling to room temperature, the reaction mixture is poured into a vigorously stirred solution of 25 ml. of concentrated hydrochloric acid and 100 g. of ice. The product crystallizes in a short time, but better yields are obtained by allowing the reaction mixture to stand at 5° C. overnight to complete the crystallization. A yield of 17.6 g. (93%) of 3,5-dibenzylhydantoin is obtained having a M.P. of 145–146° C. Analysis (percent): calculated for $C_{17}H_{16}N_2O_2$: C, 72.84; H, 5.75; N, 9.99. Found: C, 72.5; H, 5.9; N, 10.0. By repeating this example, except using an equivalent amount of 3-benzylhydantoin prepared in Example 2 and using only half the amount of benzyl chloride, the identical product is obtained but the yield is increased to 99%.

*Example 5*

This example illustrates the production of metal complexes of various 5-carboxyhydantoins. When a solution of 5.0 g. of hydantoin in 50 ml. of 2 M magnesium methyl carbonate prepared in Example 1 is heated to 50° C., the pale yellow color becomes lighter and carbon dioxide is given off. The carbon dioxide is produced by the acidic hydrogen on the nitrogen in the 3-position of the hydantoin, reacting with the magnesium methyl carbonate to form the magnesium salt, with the balance of the magnesium methyl carbonate forming the magnesium complex of 5-carboxyhydantoin. The ultraviolet spectrum of a sample of this solution when diluted a thousand-fold with methanol, showed a new peak at 270 millimicrons having a minimum extinction coefficient of 1500. Dilution with the methanol was necessary to provide a solvent which per se would not sorb in this region and to provide a dilute enough solution that measurable value could be obtained, because of the range of the equipment. Because of the above-described equilibrium reaction of methanol with the metal complex, the extinction coefficient decreased over a peirod of 20 minutes to approximately 500. Addition of a trace of hydrochloric acid caused complete disappearance of absorption in this region. To demonstrate that the new peak was due to carboxylation of the 5-position of the hydantoin and not some other position, 5,5-dimethylhydantoin, which cannot carboxylate in the 5-position, was used in place of the hydantoin. In this case, no change in the ultra-violet spectrum was observed, even after a period of 48 hours. Likewise, 3-phenyl-5-methylhydantoin does not react to form a complex with magnesium methyl carbonate.

When 3-benzylhydantoin was substituted for the hydantoin, the metal complex readily formed, again showing an absorption peak at 278 millimicrons, with a minimum extinction coefficient of 14,300. The same results are obtained when 3-phenylhydantoin is substituted for the hydantoin. When 1-methyl-3-phenylhydantoin is used in place of the hydantoin, the complex readily forms, showing an absorption peak at 275 millimicrons, with a minimum extinction coefficient of 3,500. The slight shift is due to the methyl group in the 1-position.

When the magnesium complex of 5-carboxyhydantoin prepared as described above is reacted with benzyl chloride in the ratio of 1 mole of benzyl chloride to 1 mole of the magnesium complex, both the 3- and 5-positions are apparently alkylated at the same rate, since on work-up as described above the products were 3,5-dibenzylhydantoin and unreacted hydantoin. The 3,5-dibenzylhydantoin is identical with the product obtained in Example 4 wherein 3,5-dibenzylhydantoin was obtained both by reacting 2 moles of benzyl chloride with the magnesium complex of 5-carboxyhydantoin and with 1 mole of benzyl chloride with 1 mole of magnesium complex of 3-benzyl-5-carboxyhydantoin.

Similarly, when a complex of 3-benzylhydantoin is reacted with methyl iodide in the ratio of 1 mole of methyl iodide to 1 mole of the magnesium complex, 3-benzyl-5-methylhydantoin is obtained which is identical with an authentic sample prepared by the benzylation of 5-methylhydantoin with benzyl chloride. When an excess of methyl iodide is used to alkylate the magnesium complex of 3-phenylhydantoin, 1,5-dimethyl-3-phenylhydantoin is obtained in a 68% yield which is identical with the product obtained in a 64% yield by the reaction of methyl iodide and the magnesium complex of 1-methyl-3-phenyl-5-carboxyhydantoin. Likewise, when the magnesium complex of 3-phenyl-5-carboxyhydantoin is reacted with 1,3-dibromopropane, a 48% yield of 1,5-trimethylene-3-phenylhydantoin is obtained. The type of products formed in the above reactions all lend support to the fact that the metal alkyl carbonates carboxylate the 5-position of the hydantoin and form with this carboxylated product a complex (or chelate) in which the metal forms a chelate ring with this carboxyl group and the oxygen on the carbon in the 4-position.

Further identity of the metal complexes of the 5-carboxyhydantoins is established by isolation of 3-phenyl-5-carboethoxyhydantoin from the reaction product of 150 ml. of 2 M solution of magnesium methyl carbonate prepared as described in Example 1 with 17.6 g. of 3-phenylhydantoin. The magnesium complex product is precipitated by pouring the reaction mixture into ether. After decanting off the liquid phase, ethanolic hydrogen chloride which has been previously cooled to −50° C., is added to the solid precipitate. The mixture is allowed to spontaneously warm to room temperature over a 6-hour period. Most of the ethanol is removed under vacuum and the residue poured into water. The aqueous solution is repeatedly extracted with chloroform, the chloroform layers being separated after each extraction, combined and dried after removing the chloroform at room temperature under high vacuum. The residue is 8.3 g. (35% yield) of a glassy solid having a M.P. of 108–110° C. The infrared and nuclear magnetic resonance spectra along with chemical analysis confirm that the product is 3-phenyl-5-carboethoxyhydantoin, calculated for $C_{12}H_{12}N_2O_4$ C, 58.06; H, 4.87; N, 11.29; N.E. (neutralization equivalent), 248. Found: C, 57.1; H, 4.8; N, 11.4; N.E., 253.

The remaining proton at the 5-position of 3-phenyl-5-carboethoxyhydantoin is highly acidic. The $pK_a$ was found to be 7.75 or about six orders of magnitude more acidic than diethyl malonate. The anion formed from the ester and an excess of magnesium methoxide has an absorption peak at 300 millimicrons with an extinction coefficient of 21,000.

Alkylation of 3-phenyl-5-carboethoxyhydantoin is demonstrated by dissolving a sample in an excess methanolic sodium hydroxide and adding benzyl chloride. The reaction mixture is stirred overnight at room temperature, followed by heating to reflux for 30 minutes. Aqueous hydrochloric acid is added and the mixture refluxed for 1 hour to hydrolyze and decarboxylate the ester. After stripping off the solvent, the solid residue is crystallized from ethanol. The product has a melting point of 166–168° C., compared to a reported M.P. of 170–172° C. and the infrared spectrum is identical with that of the authentic sample of 3-phenyl-5-benzylhydantoin prepared from β-phenylalanine and phenyl-isocyanate.

Refluxing the 3-phenyl-5-carboethoxyhydantoin with benzylamine and ammonium chloride replaces the ethoxy group and opens the hydantoin ring to give $N^2$-phenyl-ureido-N,N'-dibenzylmalonamide having a M.P. of 237–239° C. Analysis (percent): calculated for $C_{24}H_{24}N_4O_3$, C, 69.21 H, 5.81; N, 13.45. Found C, 69.5; H, 6.1; N, 12.8. These reactions conclusively prove the structure of the metal chelates of the 5-carboxyhydantoins.

*Example 6*

Using the following general procedure, the folowing hydantoins were prepared. The named hydantoin was dissolved in magnesium methyl carbonate in the proportions of 0.05 mole of the hydantoin to 50 ml. of 2 M solutions of the magnesium methyl carbonate. The complex is formed by heating the reaction mixture under a nitrogen or other inert gas atmosphere at 60° C. for 1.5 hours, after which 0.055 mole of the alkylating agent is added. In most instances, all of the alkylating agent can be added at one time. However, in the case of methyl iodide, benzyl chloride, and α-phenethyl bromide, the reaction is so vigorous that the halide is added dropwise. In the case of benzoyl chloride it is necessary to add the reagent slowly to the reaction mixture which has been cooled to 5° C.

The reaction mixture is heated to 110° for 5 hours or to reflux if the alkylating agent is low boiling. In the latter case, the temperature is gradually raised to 110° C. as the alkylating agent is consumed. After cooling the reaction mixture, it is poured with vigorous stirring into 25 ml. of concentrated hydrochloric acid and 100 g. of ice. The product separates and crystallizes in a short time, but higher yields are obtained when the hydrolysis mixture is allowed to stand at 5° C. overnight to complete the crystallization. The crystalline hydantoin is then removed by filtration from the reaction mixture. Table II shows the hydantoin and alkylating agent used, the hydantoin product, its melting point, and yield. In all cases where the hydantoin is not reported in the literature, it is identified by means of its infrared spectra, NMR spectra or by chemical analysis as required. Also summarized in this table are the results of Examples 4 and 5.

TABLE II

| Hydantoin Used | Alkylating Agent | Hydantoin Product | M.P.,° C. | Yield, Percent |
|---|---|---|---|---|
| Unsubstituted | Benzyl chloride [1] | 3,5-dibenzyl (i.e., 3,5-dibenzylhydantoin) | 145–146 | 93 |
| 3-benzyl | do | 3,5-dibenzyl | 145–146 | 99 |
| Do | Methyl iodide | 3-benzyl-5-methyl | 112–114 | 63 |
| Do | α-Phenethyl bromide | 3-benzyl-5-α-phenethyl [2] | 140–143 168–172 | 56 |
| 3-phenyl | Benzyl chloride | 3-phenyl-5-benzyl | 170–172 | 90 |
| Do | 1-bromo-3-methylbutane | 3-phenyl-5-isoamyl | 117–119 | 95 |
| Do | Isobutyl bromide | 3-phenyl-5-isobutyl | 126–127 | 66 |
| Do | β-Phenethyl bromide | 3-phenyl-5-β-phenethyl | 117–119 | 75 |
| Do | Methyl iodide [1] | 3-phenyl-1,5-dimethyl | 145–147 | 68 |
| 1-methyl-3-phenyl | do | do | 145–147 | 62 |
| 3-phenyl | Isopropyl bromide | 3-phenyl-5-isopropyl | 123–125 | 40 |
| Do | 1,3-dibromopropane | 3,5-trimethylene-3-phenyl | 117–119 | 48 |
| Do | 2,6-dimethyl-5-chloromethylanisole | 3-phenyl-5-(2,4-dimethyl-3-methoxybenzyl) | 156–158 | 77 |
| Do | Benzaldehyde | 3-phenyl-5-α-hydroxybenzyl | [3] | |
| Do | Heptaldehyde | 3-phenyl-5-α-hydroxyheptyl | [3] | |
| Do | Ethylchloroformate [4] | 1,5-di-(carboethoxy)-3-phenyl [1] | 94–97 | |
| Do | Chloromethylbenzyl sulfide | 3-phenyl-5-benzylthiomethyl | 150–151 | 64 |
| 3-decyl | Benzyl chloride | 3-decyl-5-benzyl | 102–103 | 62 |
| 1-acetyl-3-phenyl | 1,4-dibromobutane | 1,5-tetramethylene-3-phenyl | 159–160 | 94 |
| 3-phenyl | Benzoyl chloride | 3-phenyl-5-benzoyl | 198–200 | 53 |
| Do | Benzoic anhydride | 3-phenyl-5-benzoyl | 198–200 | 86 |

[1] Double the amount of alkylating agent used.
[2] Due to asymmetric carbon atom two diastereoisomers are found, as expected. After recrystallization of the mixture of the two, the low melting isomer is selectively dissolved in benzene. The high melting one is soluble in ethanol.
[3] Both of these compounds are a mixture of two diastereoisomers, as expected, and therefore do not give a sharp melting point. The isomers are not readily separable by selective dissolution. In order to get sharp melting hydantoins, they are dehydrated by heating with aqueous sulfuric acid to the corresponding 3-phenyl-5-benzylidenehydantoin, M.P. 256–257° C. and 3-phenyl-5-heptylidenehydantoin, M.P. 125–128° C. which are not mixtures.
[4] This acyl halide is so reactive that even though only equimolar amounts were used, alkylation of both the 1- and 3-positions occurs.

*Example 7*

The hydantoins listed in Table II are prepared using the following general procedure. A solution is made by dissolving 44 grams of 3-phenylhydantoin in 375 ml. of 2.1 M magnesium methyl carbonate in a 1-liter, 3-necked flask equipped with a gas inlet tube, thermometer, magnetic stirrer and vent tube. The solution is heated to 80° C. and held for 2 hours under a slow stream of nitrogen to form the magnesium complex of 3-phenyl-5-carboxyhydantoin. At this time, the alkylating agent is added and the temperature raised to 100° C. and held at this temperature for 5 hours. At the end of this time, the solution is cooled to room temperature and poured into 600 g. of ice and 150 ml. of concentrated hydrochloric acid. After standing in a refrigerator for 24 hours, the precipitated product is filtered off. Extraction of the filtrate with chloroform indicates that all of the product has precipitated, since evaporation of chloroform yields no further product.

filtrate from the hydrolysis. Any barium ion remaining in the solution is conveniently precipitated from the reaction mixture either by bubbling in carbon dioxide or more conveniently by adding enough ammonium carbonate to insure an excess over the barium ion remaining in the solution and the solution heated to boiling. After filtering the further precipitate of barium carbonate, the solution is evaporated to dryness which decomposes any excess ammonium carbonate and any ammonium salt of

TABLE III

| Alkylating Agent | Hydantoin Product | Yield, percent | M.P.,° C. |
|---|---|---|---|
| Isopropyl bromide | 3-phenyl-5-isopropyl | 40 | 123–125 |
| Isobutyl bromide | 3-phenyl-5-isobutyl | 66 | 126–127 |
| Benzyl chloride | 3-phenyl-5-benzyl | 98 | 170–172 |
| Gramine | 3-phenyl-5-skatyl | 55 | 173–175 |
| 1,3-dibromopropane | 3-phenyl-1,5-trimethylene | 48 | 117–119 |
| 4-phthalimido-1-bromobutane | 3-phenyl-5-(δ-phthalimidobutyl) | 53 | 117–119 |
| Sodium β-chloropropionate | 3-phenyl-5-(β-carboxyethyl) | 56 | 168–169 |

Examples 6 and 7 illustrate the wide variety of 5-substituted hydantoins which may be obtained readily by reacting a wide variety of alkylating agents with the magnesium complex of the 5-carboxyhydantoins.

Example 8

This example illustrates that the zinc and calcium complexes of 5-carboxyhydantoins can be used in the same way as the magnesium complexes to produce 5-substituted hydantoins.

The entire amount of zinc methyl carbonate solution containing the sodium chloride precipitate of Example 1 is reacted with 8.8 g. of 3-phenylhydantoin for 2 hours at 90° C. under a nitrogen atmosphere in a reaction vessel equipped with a stirrer, reflux condenser, thermometer and gas inlet, to form the zinc complex of 3-phenyl-5-carboxyhydantoin. To this solution, 6.3 g. of benzyl chloride is added and the reaction continued for 16 hours at 90° C. The reaction mixture is poured into 150 g. of ice and 50 ml. of concentrated hydrochloric acid, to precipitate the hydantoin and dissolve the sodium chloride present from the formation of the zinc methylate. After standing several hours in the refrigerator the precipitate is filtered yielding 10.5 g. (85% yield) of solid which after recrystallization from ethanol melts at 168–169° C. and has an infrared spectra identical with an authentic sample of 3-phenyl-5-benzylhydantoin.

In a repeat of this example but using 50 ml. of 2 M calcium methyl carbonate from Example 1 and heating for 2 hours at 100° C. after addition of the benzyl chloride, the yield of 3-phenyl-5-benzylhydantoin is 11.5 g. (96%).

Example 9

The above 5-substituted hydantoins prepared by my process may be readily hydrolyzed to the corresponding α-amino acid as shown by this example, in which the general method for the hydrolysis is as follows: the hydantoin and barium hydroxide octahydrate are placed in a stainless steel liner of a stirred pressure autoclave and sufficient water added to dissolve all of the barium hydroxide at the elevated temperature used and to provide an easily-stirrable slurry. Since one mole of carbon dioxide is generated for each mole of hydantoin hydrolyzed, at least 1 mole of barium hydroxide should be used for each mole of hydantoin, preferably an excess of the barium hydroxide should be used to insure maximum yield. The autoclave is closed and the temperature raised to 150° C. for a period of 2 hours and cooled to 100° C., the pressure released, and the barium carbonate filtered from the solution while still hot. The barium carbonate is washed well with boiling water and the wash water added to the the α-amino acid which may have formed, leaving behind the α-amino acid as a solid crystalline product.

To illustrate this general method, the 3-phenyl-5-benzylhydantoin obtained in Example 9 (61 g.) is combined with 160 g. of barium hydroxide octahydrate and 1500 ml. of water in a stirred autoclave. The reaction mixture is heated to 150° for 2 hours, cooled to 100° C. and filtered. The barium carbonate filtered from the solution is heated to boiling with 200 ml. of water and the filtrate combined with the filtrate from the hydrolysis. To the combined filtrates, 35 g. of ammonium carbonate is added and heated to boiling and the barium carbonate filtered from the solution. On evaporating the solution to dryness, a yield of 97% of dl-phenylalanine is isolated, having a melting point of 275–280° C. The melting point and infrared spectra of the product are identical with that of reagent grade dl-phenylalanine.

Using the same procedure the hydantoins shown in Table III are hydrolyzed to their corresponding α-amino acids, with the results shown in Table IV.

TABLE IV

| Hydantoin Used | Amino Acid Product | Yield |
|---|---|---|
| 3-phenyl-5-isopropyl | Dl-valine | 95 |
| 3-phenyl-5-isobutyl | Dl-leucine | 70 |
| 3-phenyl-5-benzyl | Dl-phenylalanine | 99 |
| 3,5-dibenzyl | Dl-phenylalanine | 92 |
| 3-phenyl-5-skatyl | Dl-tryptophan | 97 |
| 3-phenyl-1,5-trimethylene | Dl-proline | 94 |
| 3-phenyl-5-(δ-phthalimido-butyl) | Dl-lysine-hydrochloride* | 85 |
| 3-phenyl-5-(β-carboxyethyl) | Dl-glutamic acid | 53 |

* One additional mole of Ba(OH)₂—8H₂O used which hydrolyzes the phthalimido group to amino group simultaneously with hydrolysis of the hydantoin. Lysine is only stable in solid form as an acid salt, e.g. as the hydrochloride.

By the same procedure other typical 5-substituted hydantoins disclosed above are hydrolyzed to the α-amino acids shown in Table V.

TABLE V

| Hydantoin used: | Amino acid product |
|---|---|
| 3,5-dibenzyl | dl-Phenylalanine. |
| 3-benzyl-5-methyl | dl-Alanine. |
| 3 - benzyl - 5 - α-phenethyl | dl-α-Phenylbutyrine. |
| 3-phenyl-5-benzyl | dl-Phenylalanine. |
| 3-phenyl-5-isoamyl | dl - α - Amino-δ-methyl caprylic acid. |
| 3-phenyl-5-isobutyl | dl-Leucine. |
| 3 - phenyl - 5 - β - phenethyl | dl-β-Phenylbutyrine. |
| 3 - phenyl - 1,5 - dimethyl | dl-N-Methylalanine. |

TABLE V—Continued

| Hydantoin used: | Amino acid product |
|---|---|
| 3-phenyl-5-isopropyl | dl-Valine. |
| 1,5 - trimethylene - 3-phenyl | dl-Proline. |
| 3 - phenyl - 5 - (3,5-dimethyl - 4 - methoxybenzyl) | dl - (3,5 - Dimethyl - 4-methoxyphenyl) alanine, alternatively named methylether of dl-3,5-dimethyltyrosine. |
| 3 - phenyl - 5 - α - hydroxybenzyl | dl - β - hydroxyphenylalanine (mixture of 2 diastereoisomers). |
| 3 - phenyl - 5 - α - hydroxyheptyl | dl - α - Amino - β - hydroxy - nonanoic acid (mixture of 2 diastereoisomers). |
| 1,5 - di - (carboethoxy)-3-phenyl | dl-Aminomalonic acid. |
| 3 - phenyl - 5 - benzylthiomethyl | dl - Benzylthiobutyrine, alternatively named dl-S-benzylcysteine. |
| 3-decyl-5-benzyl | Phenylalanine. |
| 1,5 - tetramethylene - 3-phenyl | dl-Pipecolic acid. |
| 5,5' - octamethylenebis-(3 - phenylhydantoin) | dl - α,α' - Diaminododecanedioic acid (dl-octamethylenebis - (α - aminoacetic acid). |

The above examples have illustrated many of the modifications and variations of the present invention, but obviously other modifications and variations of the present invention are possible in light of the above teaching. Therefore, it is to be understood that changes and variations may be made in the particular embodiments of the invention described which are within the full intended scope of the invention as defined by the appended claims.

What I claim as new and desire to secure by Letters Patent of the United States is:

1. The metal chelate of a 5-carboxyhydantoin wherein the metal is selected from the group consisting of magnesium, zinc and calcium.
2. The magnesium chelate of a 5-carboxyhydantoin.
3. The zinc chelate of a 5-carboxyhydantoin.
4. The calcium chelate of a 5-carboxyhydantoin.
5. The metal chelate of a 3-aryl-5-carboxyhydantoin wherein the metal is selected from the group consisting of magnesium, zinc and calcium.
6. The metal chelate of a 3-alkyl-5-carboxyhydantoin wherein the metal is selected from the group consisting of magnesium, zinc and calcium.
7. The metal chelate of 5-carboxyhydantoin wherein the metal is selected from the group consisting of magnesium, zinc and calcium.
8. The process of producing a metal chelate of a 5-carboxyhydantoin which comprises reacting a solution of an hydantoin having two hydrogen atoms on the ring carbon atom in the 5-position, with a metal alkyl carbonate, said metal being selected from the group consisting of magnesium, zinc and calcium.
9. The process of producing the magnesium chelate of a 5-carboxyhydantoin which comprises reacting a solution of an hydantoin having two hydrogens on the ring carbon atom in the 5-position, with magnesium methyl carbonate.
10. The process of producing the zinc chelate of a 5-carboxyhydantoin which comprises reacting a solution of an hydantoin having two hydrogens on the ring carbon atom in the 5-position, with zinc methyl carbonate.
11. The process of producing the calcium chelate of a 5-carboxyhydantoin which comprises reacting a solution of an hydantoin having two hydrogens on the ring carbon atom in the 5-position, with calcium methyl carbonate.
12. The process of producing a 5-substituted hydantoin which comprises reacting an alkylating agent with a solution of a metal chelate of a 5-carboxyhydantoin wherein the metal is selected from the group consisting of magnesium, zinc and calcium, acidifying the reaction mixture to form a water-soluble salt of the metal and separating the 5-substituted hydantoin from the reaction mixture.
13. The process of claim 12 wherein the metal chelate of a 5-carboxyhydantoin is the metal chelate of a 3-hydrocarbon-5-carboxyhydantoin.
14. The process of producing 5-isopropylhydantoin which comprises reacting the 5-position of a metal chelate of a 5-carboxyhydantoin having a hydrogen on the nitrogen in the 1-position, wherein the metal is selected from the group consisting of magnesium, zinc and calcium, with an isopropyl halide wherein the halogen is selected from the group consisting of chlorine, bromine and iodine, acidifying the reaction mixture to form a water-soluble salt of the metal and separating the 5-isopropylhydantoin from the reaction mixture.
15. The process of making a 5-isobutyl-hydantoin which comprises reacting the 5-position of a metal chelate of a 5-carboxyhydantoin having a hydrogen on the nitrogen in the 1-position, wherein the metal is selected from the group consisting of magnesium, zinc and calcium, with an isobutyl halide wherein the halogen is selected from the group consisting of chlorine, bromine and iodine, acidifying the reaction mixture to form a water-soluble salt of the metal and separating the 5-isobutylhydantoin from the reaction mixture.
16. The process of making a 5-benzylhydantoin which comprises reacting the 5-position of a metal chelate of a 5-carboxyhydantoin having a hydrogen on the nitrogen in the 1-position, wherein the metal is selected from the group consisting of magnesium, zinc and calcium, with a benzyl halide, wherein the halogen is selected from the group consisting of chlorine, bromine and iodine, acidifying the reaction mixture to form a water-soluble salt of the metal and separating the 5-benzylhydantoin from the reaction mixture.
17. The process of making a 5-β-carboxyethylhydantoin which comprises reacting the 5-position of a metal chelate of a 5-carboxyhydantoin having a hydrogen on the nitrogen in the 1-position, wherein the metal is selected from the group consisting of magnesium, zinc and calcium, with an alkali metal salt of a β-halopropionic acid wherein the halogen is selected from the group consisting of chlorine, bromine and iodine, acidifying the reaction mixture to form a water-soluble salt of the metal and separating the 5-β-carboxyethylhydantoin from the reaction mixture.
18. The process of making a 1,5-trimethylenehydantoin which comprises reacting the 1- and 5-positions of a metal chelate of a 5-carboxyhydantoin having a hydrogen on the nitrogen in the 1-position, wherein the metal is selected from the group consisting of magnesium, zinc and calcium, with a 1,3-dihalopropane, wherein the halogen is selected from the group consisting of chlorine, bromine and iodine, acidifying the reaction mixture to form a water-soluble salt of the metal and separating the 1,5-trimethylenehydantoin from the reaction mixture.
19. The process of making a 5-skatyl-hydantoin which comprises reacting the 5-position of a metal chelate of a 5-carboxyhydantoin having a hydrogen on the nitrogen in the 1-position, wherein the metal is selected from the group consisting of magnesium, zinc and calcium, with gramine, acidifying the reaction mixture to form a water-soluble salt of the metal and separating the 5-skatylhydantoin from the reaction mixture.
20. The process of producing a 5-δ-phthalimidobutyl-hydantoin which comprises reacting the 5-position of a metal chelate of a 5-carboxyhydantoin having a hydrogen on the nitrogen in the 1-position wherein the metal is selected from the group consisting of magnesium, zinc and calcium, with a 4-phthalimidobutyl halide wherein the halogen is selected from the group consisting of chlorine, bromine, and iodine, acidifying the reaction mixture to form a water-soluble salt of the metal and separating the 5-δ-phthalimidobutylhydantoin from the reaction mixture.

References Cited
UNITED STATES PATENTS

| | | | |
|---|---|---|---|
| 2,498,300 | 2/1950 | Scott et al. | 260—309.5 |
| 3,055,936 | 9/1962 | Stiles et al. | 260—526 |
| 3,117,130 | 1/1964 | Gagliardi et al. | 260—299 |

OTHER REFERENCES

Elderfield: Heterocyclic Compounds, vol. 5, pp. 255–6.
Finkbeiner et al.: J. Am. Chem. Soc. 85, 616 (1963).
Gaudry: Can. J. Research 24b, 301 (1946).
Gaudry: Can. J. Research 26b, 387 and 773 (1948).
Livak et al.: J. Am. Chem. Soc. 67, 2218 (1945).
Stiles: J. Am. Chem. Soc., vol. 81 (1959), pp. 2598–9.

ALEX MAZEL, *Primary Examiner.*

DANIEL D. HORWITZ, *Examiner.*

R. J. GALLAGHER, *Assistant Examiner.*